Dec. 15, 1931.  P. S. WICKERHAM  1,837,002
SEWAGE DISPOSAL APPARATUS
Filed March 22, 1930  2 Sheets-Sheet 1
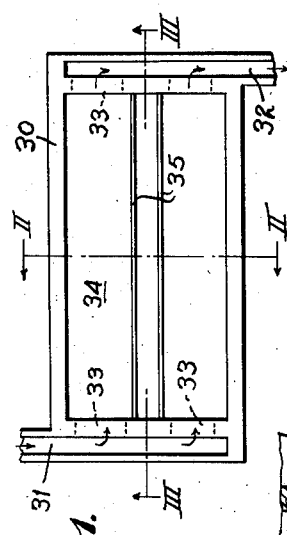
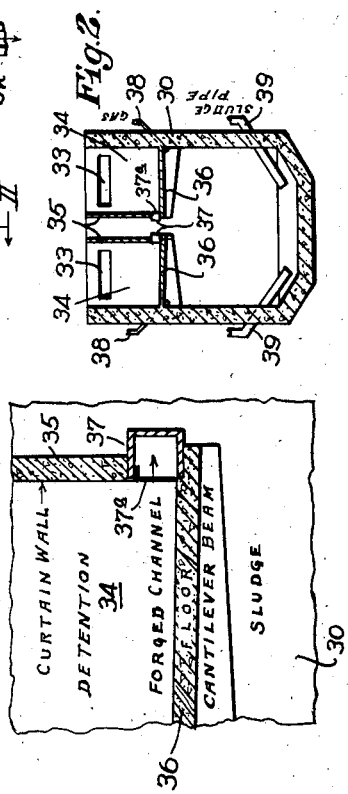
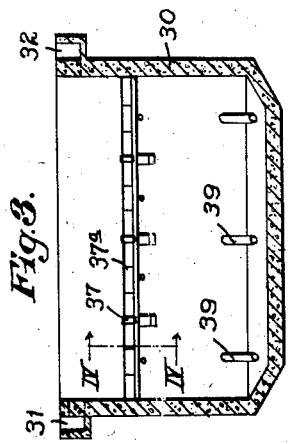
Philip S. Wickerham INVENTOR
BY Archworth Martin,
ATTORNEY

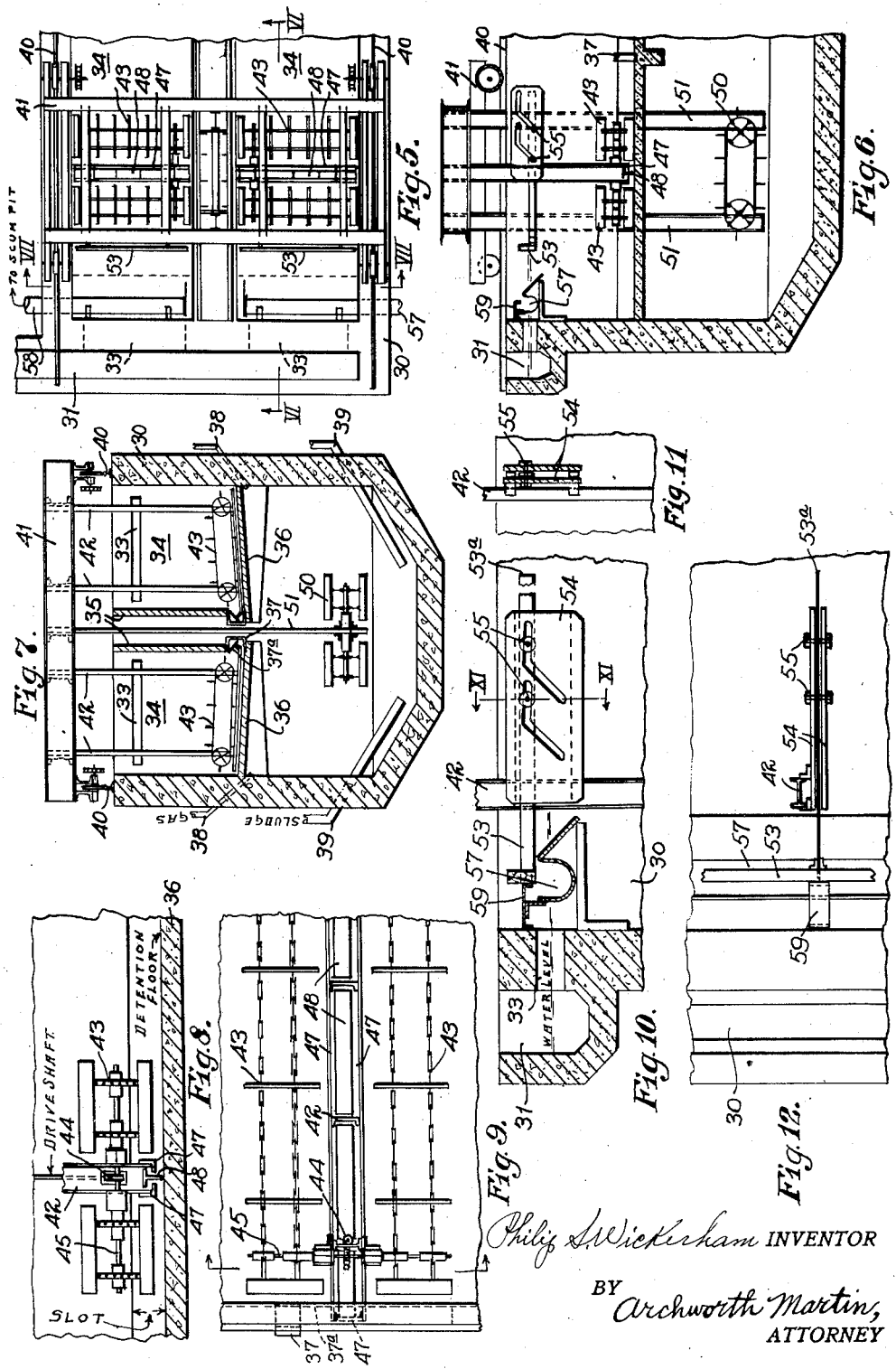

Patented Dec. 15, 1931

1,837,002

UNITED STATES PATENT OFFICE

PHILIP S. WICKERHAM, OF BUTLER, PENNSYLVANIA

SEWAGE DISPOSAL APPARATUS

Application filed March 22, 1930. Serial No. 438,124.

My invention relates more particularly to sewage disposal apparatus, although it is capable of use in various other ways such as in connection with paper waste plants, tanneries, water works, etc., for the removal and disposal of sludge from liquids.

One object of my invention is to provide a tank or an apparatus of the type described which for a given effective capacity will be much smaller and less expensive than various older types of disposal apparatus.

Another object of my invention is to provide an apparatus wherein there is better distribution of sediment and control of flow of the liquid and wherein tendency for clogging of the system by sediment is reduced.

Another object of my invention is to provide a system wherein is there not only less horizontal space required to provide a certain capacity, but wherein the vertical dimension is much less than in types heretofore employed.

Another object of my invention is to provide apparatus wherein there is effective and uniform distribution of the sludge which is precipitated from a body of liquid.

In the accompanying drawings, Fig. 1 is a plan view of the tank structure which I employ; Fig. 2 is a view taken on the line II—II of Fig. 1; Fig. 3 is a view taken on the line III—III of Fig. 1; Fig. 4 is an enlarged detail view taken on the line IV—IV of Fig. 3; Fig. 5 is a fragmentary plan view showing the operating mechanism mounted upon the tank; Fig. 6 is a view taken on the line VI—VI of Fig. 5; Fig. 7 is a view taken on the line VII—VII of Fig. 5; Fig. 8 is a sectional view, on an enlarged scale, of a portion of the apparatus of Fig. 7; Fig. 9 is a plan view of the structure of Fig. 8; Fig. 10 is a view, on an enlarged scale, of a portion of the structure of Fig. 6; Fig. 11 is a plan view on the line XI—XI of Fig. 10; and Fig. 12 is a plan view of the structure of Fig. 10.

Referring now to Figs. 1, 2, 3 and 4, I show a tank 30 that may be of concrete or other suitable material. Sewage or other liquid to be treated enters the tank from an inlet 31 and is discharged therefrom to a conduit 32. The inner end walls of the tank have openings 33 through which the fluid flows always in the direction indicated by the arrows, no reversal of flow being required. The tank is divided into detention chambers 34 which have inner side walls or curtain walls 35, and bottom or detention walls 36. The curtain walls 35 are spaced from the bottom or detention walls 36 by short channel-shaped blocks 37, which serve to support the curtain walls, spaces being left between the channels, as shown more clearly in Fig. 3, to permit removal of sludge from the detention walls 36 beneath the curtain walls, to cause the same to fall to the bottom of the tank. The space between the bottom of the tank and the undersides of the walls 36 constitute a sludge chamber. The walls 36 slope inwardly slightly so that gas will accumulate in the upper corners of the sludge chambers and be conducted away through gas pipes 38, instead of rising through the space between the curtain walls 35. At least only a small amount of gases will rise through such space.

The curtain walls 35 are set inwardly from the inner edges of the walls 36, so that such gas as it rises through the space between the detention walls 36 will freely pass the openings into the detention chambers and not enter the detention chambers behind the walls 35 by being deflected beneath the curtain walls. The sludge may be pumped off through sludge pipes 39.

As shown more clearly in Figs. 3 and 4, in addition to setting the curtain walls 35 inwardly from the inner edges of the detention walls 36 to prevent entry of gases into the detention chambers, I provide gate members or flaps 37a that are pivotally supported in the space beneath the curtain walls 35. These gate members are of short length relative to the length of the curtain walls, so that each section may be opened independently of the adjacent sections in a manner hereinafter described, thereby serving to isolate the detention chambers from the sludge chamber. The gate members effectively prevent such gas which may rise between the curtain walls from entering the detention chambers and disturbing the precipitation of the solids therein.

Further, by reason of the isolation of the detention chambers from the sludge chamber, I may economically employ heat to raise the temperature of the liquid in the sludge chamber to aid the "digestion" of the sludge. Particularly in the winter, the "digestion process" is greatly retarded by the lowered temperatures, and the time required to effect proper digestion is greatly increased. By controlling the temperature of the liquid in the sludge chamber, the time required for digestion is reduced to a minimum. Also, the upward circulation of heated water will not agitate the liquid in the detention chambers and thereby prevent settling of the sediment.

Heretofore, it has not been economical to employ heat to aid digestion in this type of apparatus, since dissipation of the heat resulted from the circulation and flow of liquid through the tank, the heated liquid being constantly discharged from the tank and by radiation, requiring, therefore, an excessive supply of heat to heat the circulating and discharging liquid. In my tank structure, I provide for a continuous flow of liquid through the detention chambers; and, by isolating the chambers from the sludge chamber, I prevent free circulation of the liquids between the chambers, and thereby prevent discharge of heated liquid from the sludge chamber to reduce the amount of heat lost through absorption and radiation.

It will be seen that by reason of the approximately horizontal disposition of the detention walls 36 and the arrangement made for the exit of gases, the tank of Figs. 1 to 4 can be of relatively shallow depth for a given capacity, thus saving in material and in depth of excavation required for installing the tank. Furthermore, horizontal dimensions are reduced by reason of the fact that owing to the sludge-handling apparatus hereinafter described, no reversal of flow is required in order to effect distribution of the sludge in the sludge chamber.

Referring to Sheet 2 of the drawings, I show apparatus applied to the tank of Figs. 1 to 4, for handling the sludge. Tracks 40 are mounted upon the upper edges of the tank and extend longitudinally thereof. These tracks support a wheeled carriage 41. Frame members 42 are carried by and depend from the carriage. These frame members support distributing conveyers 43 of the endless chain type, the conveyers carrying blades or vanes that move along the detention walls 36 to scrape the material from such walls and force it beneath the curtain walls 35 from whence it falls into the sludge chamber.

As shown more clearly in Figs. 8 and 9, a drive shaft extends downwardly from the carriage 41, being driven by a motor or any suitable source of power (not shown) and operates through a worm gear 44 to drive shafts 45 around which the sprocket chains of the conveyers pass. The carriage is movable longitudinally of the tank on the tracks 40 carrying with it the conveyers 43 which are driven in directions transverse to the path of travel of the carriage, so that the detention floors 36 will be swept clear of material throughout the entire length of the tank although the conveyers are of relatively narrow width. In order to reduce excessive drag and friction by the conveyer vanes on the bottom of the tank, the sprocket wheels are mounted such distance above the detention floors 36 that when immediately beneath the sprocket wheels, the vanes will not scrape the floor, but will engage the floor only at points some distance from the sprocket wheels where the lower runs of the conveyers sag slightly.

The conveyers at each side of the tank are mounted in pairs, as shown more clearly in Figs. 8 and 9, on the supporting frame work 42 which carries angle bars 47 (Fig. 8) which loosely support scrapers or feeder dam members 48. These scraper members are of short length relative to the length of the conveyers, so that they will have flexibility or independent movement for rise and fall when moving along the detention floors 36. Movement of the carriage and the depending frame 42, of course, carries the scrapers 48 along the detention floor, thus accumulating material which would otherwise be permitted to accumulate along the bottom of the tank in diagonal ridges by reason of the bodily traveling movement of the conveyers in directions longitudinally of the tank.

The scrapers 48 serve to pile up the material so that it is more effectively forced beneath the curtain walls by the conveyers. By reason of the channel formation of the supporting blocks 37, the angle bars and the scraper dams 48 are extended completely beneath the lower edges of the curtain walls and their movement, nevertheless, is unobstructed by the supporting blocks.

The hereinbefore described gate members 37a are successively engaged by the inner ends of the angle bars 47 during their longitudinal movements and actuate each gate member outwardly to its open position. With the gate member in its opening position, an unobstructed passageway for the material is effected without materially affecting the isolation of the detention chamber.

In order to more uniformly distribute the sludge along the bottom of the sludge chamber and mix the same to control the pH value of the contents, I provide a conveyer 50 which is supported from the carriage 41 by framework 51. The conveyer 50 is driven from the carriage in a manner similar to that in which the conveyers 43 are driven, but is directed or disposed longitudinally of the tank instead of transversely thereof as are the conveyers 43, so that it will more effectively mix and spread the material upon the bottom of the tank during traveling movement of the carriage 41, thus maintaining the sludge at a uniform consistency and of more uniform pH value throughout the mass thereof.

Referring more particularly to Figs. 5, 6, 10, 11 and 12, I show means for removing scum from the tank. The liquid is skimmed by skimmer bars 53, one over each of the detention tanks. These skimmers are supported by plates 54 that are connected to the frame members 42 which are suspended from the carriage 41, the skimmer bars having pins 55 that extend through slots in the plates 54. The slots through which the pins 55 extend are angular. The pins may carry anti-friction rollers. The skimmer bar in its working or skimming position, occupies the position shown in Fig. 6, with the pins 55 in the bottoms of the slots. Forward movement of the carriage will cause the skimmer 53 to push scum from the surface of the liquid into a trough 57 from whence it can flow through a conduit 58 to a scum pit. The scum which accummulates in front of the skimmer bar during forward movement of the carriage is pushed up over the inclined edge of the trough 57, as will be apparent in Fig. 10, and the skimmers are elevated. Just before this forward movement of the carriage is completed, the skimmer engages first the said inclined edge of the trough, to elevate simultaneously the scum and the skimmer, the skimmer always being maintained in horizontal position by the pins 55. The scum at this time falls into the trough. Upon further advance movement, the skimmer engages a stop shoulder 59 that results in the skimmer being pushed along the horizontal portions of the slot to the position shown in Fig. 10, so that the skimmer bar is elevated above the liquid level and will not exert a skimming action during retracting movement of the carriage.

The upper portions of the slots can be inclined in backward and downward directions to prevent accidental displacement of the skimmer during its retractive movement.

At the end of the retractive movement, the ends 53a of the skimmer bars will abut against the opposite end of the tank and cause the skimmer bar and the pins 55 to return to their lower or skimming positions.

I claim as my invention:—

1. Apparatus for precipitating solids out of liquids comprising a settling tank, means for directing a flow of liquid into and from said tank in the upper portions thereof, a pair of detention surfaces disposed between the line of the flow and the bottom of said tank, the said surfaces being disposed in a generally horizontal plane with their inner edges spaced apart at substantially the longitudinal center line of the tank, and vertically-disposed curtain walls above the inner end of each detention surface, and in vertically-spaced relation thereto, each curtain wall being offset further from the longitudinal center line of the tank than is the inner edge of its associated detention surface.

2. Apparatus for precipitating solids out of liquids comprising a settling tank, means for directing a flow of liquid into and from said tank in the upper portions thereof, a pair of detention surfaces disposed between the line of flow and the bottom of said tank, the said surfaces being disposed in a generally horizontal plane with their inner edges spaced apart at substantially the longitudinal center line of the tank, and vertically-disposed curtain walls above the inner end of each detention surface, and in vertically-spaced relation thereto, means movable transversely of the detention surfaces for scraping precipitated material beneath said curtain walls to permit the material to fall from said surfaces, and means movable adjacent to the bottom of the tank for distributing the material which falls from the detention surfaces.

3. Apparatus for precipitating solids out of liquid comprising a tank, means for directing a flow of liquid through the upper portion of said tank, a detention surface below the line of flow on which solids are collected, one edge of the detention surface being free of obstruction to permit solids to fall therefrom to the bottom of the tank, a horizontally-disposed endless conveyer having scraper vanes movable across said surface toward the free edge thereof, the conveyer being of short width relative to the length of the tank and said surface, and means for bodily moving said conveyer longitudinally of the tank.

4. Apparatus for precipitating solids out of liquid comprising a tank, means for directing a flow of liquid through the upper portion of said tank, a detention surface below the line of flow on which solids are collected, one edge of the detention surface being free of obstruction to permit solids to fall therefrom to the bottom of the tank, a pair of horizontally-disposed endless conveyers positioned in side-by-side relation having scraper vanes movable across said surface toward the free edge thereof, the conveyers being of short width relative to the length of the tank and said surface, and means for bodily moving said conveyers longitudinally of the tank, simultaneously with movement of the conveyers transversely of the said surface, whereby said conveyers are alternately in leading relation to the direction of longitudinal movement thereof.

5. Apparatus for precipitating solids out of liquid comprising a tank, means for directing a flow of liquid through the upper portion of said tank, a detention surface below the line of flow, one edge of the detention surface being free of obstruction to permit solids to fall therefrom to the bottom of the tank, an endless conveyer having scraper vanes movable across said surface toward the free edge thereof, the conveyer being of short width relative to the length of the tank and said surface, and means for bodily moving said conveyer longitudinally of the tank, simultaneously with movement of the conveyer transversely of the said surface, and a scraper bar supported on said surface adjacent to and in substantial parallelism with the bottom path of rotative movement of the conveyer.

6. Apparatus for precipitating solids out of liquid comprising a tank, means for directing a flow of liquid through the upper portion of said tank, a detention surface below the line of flow, one edge of the detention surface being free of obstruction to permit solids to fall therefrom to the bottom of the tank, an endless conveyer having scraper vanes movable across said surface toward the free edge thereof, the conveyer being of short width relative to the length of the tank and said surface, and means for bodily moving said conveyer longitudinally of the tank, simultaneously with movement of the conveyer transversely of the said surface, and a plurality of scraper bars loosely supported on said surface in end to end relation, adjacent to and in substantial parallelism with the bottom path of rotative movement of the conveyer.

7. Apparatus for precipitating solids out of liquid comprising a tank, means for directing a flow of liquid through the upper portion of said tank, a detention surface below the line of flow, one edge of the detention surface being free of obstruction to permit solids to fall therefrom to the bottom of the tank, an endless conveyer having scraper vanes movable across said surface toward the free edge thereof, the conveyer being of short width relative to the length of the tank and said surface, and means for bodily moving said conveyer longitudinally of the tank, simultaneously with movement of the conveyer transversely of the said surface, and a scraper bar supported on said surface adjacent to and in substantially parallelism with the bottom path of rotative movement of the conveyer, the inner end of said scraper bar projecting under the curtain wall.

8. Apparatus for precipitating solids from liquids comprising a tank, means for directing a flow of liquid through the upper portion of the tank, a pair of detention surfaces disposed beneath the line of flow with their inner edges in laterally-spaced relation, a curtain wall disposed above the inner edge portion of each detention surface, a carriage supported above said tank, and a scraper device suspended from the carriage above each of said surfaces, means for moving said scraper devices to remove material from said surfaces beneath said curtain walls, to permit the material to fall from said surfaces, the carriage being movable in directions transverse to the said direction of scraper movement, a scraping device adjacent to the bottom of the tank and means extending between the walls for supporting said conveyer.

9. Liquid treating apparatus comprising a settling tank, a trough disposed in the upper portion of said tank, a carriage movable above the tank, a skimming device carried by said carriage, the carriage being movable in directions transversely of the said trough to effect movement of scum from the surface of the liquid into the trough, means for elevating the skimmer above the surface of the liquid when the carriage approaches its limit of advance movement, and means for lowering the skimmer into the liquid at completion of retractive movement of the carriage.

10. Liquid-treating apparatus comprising a settling tank, a skimming device, means for moving the skimming device across the tank at such height that it is partially immersed in liquid within the tank, means for elevating the skimmer above the surface of the liquid when at one end of its path of movement, and means for lowering the skimming device into the liquid at another end of its path of movement.

11. Apparatus for precipitating solids out of liquids, comprising a settling tank, an inner curtain wall cooperating with one side of the tank to form a detention chamber, a horizontally-disposed detention surface in the lower part of said chamber, and positioned with one edge vertically spaced beneath said wall supporting blocks of channel form interposed between the said detention surface and the lower edge of the curtain wall, the flange-connecting webs of the channel blocks being disposed in a vertical plane exteriorly of the chamber, and scraper means movable over said detention surface and extending beneath the curtain wall.

12. Apparatus for precipitating solids out of liquids, comprising a settling tank, an inner curtain wall cooperating with one side of the tank to form a detention chamber, a horizontally-disposed detention surface in the lower part of said chamber and extending beneath said wall in spaced relation therewith, supporting blocks of channel form interposed between the said detention surface and the lower edge of the curtain wall at longitudinally-spaced points, the flange-connecting webs of the channel blocks being disposed in a vertical plane beyond the edge of the detention surface scraper means movable over said detention surface and extending beneath the curtain wall, and outwardly-swinging gate members mounted beneath said curtain wall in position to be swung outwardly by engagement with the end of said scraper means.

In testimony whereof I, the said PHILIP S. WICKERHAM have hereunto set my hand.

PHILIP S. WICKERHAM.